US007885813B2

(12) United States Patent
Blair et al.

(10) Patent No.: US 7,885,813 B2
(45) Date of Patent: Feb. 8, 2011

(54) SYSTEMS AND METHODS FOR ANALYZING COMMUNICATION SESSIONS

(75) Inventors: Christopher D. Blair, South Chailey (GB); Joseph Watson, Alpharetta, GA (US)

(73) Assignee: Verint Systems Inc., Melville, NY (US)

( * ) Notice: Subject to any disclaimer, the term of this patent is extended or adjusted under 35 U.S.C. 154(b) by 842 days.

(21) Appl. No.: 11/540,736

(22) Filed: Sep. 29, 2006

(65) Prior Publication Data

US 2008/0082340 A1 Apr. 3, 2008

(51) Int. Cl.
*G01L 15/00* (2006.01)

(52) U.S. Cl. ........................... 704/246; 704/251; 705/1; 379/88.1

(58) Field of Classification Search ................. 704/246, 704/251; 705/1; 379/88.1
See application file for complete search history.

(56) References Cited

U.S. PATENT DOCUMENTS

| | | | |
|---|---|---|---|
| 3,594,919 | A | 7/1971 | De Bell et al. |
| 3,705,271 | A | 12/1972 | De Bell et al. |
| 4,510,351 | A | 4/1985 | Costello et al. |
| 4,684,349 | A | 8/1987 | Ferguson et al. |
| 4,694,483 | A | 9/1987 | Cheung |
| 4,763,353 | A | 8/1988 | Canale et al. |
| 4,815,120 | A | 3/1989 | Kosich |
| 4,924,488 | A | 5/1990 | Kosich |
| 4,953,159 | A | 8/1990 | Hayden et al. |
| 5,016,272 | A | 5/1991 | Stubbs et al. |
| 5,101,402 | A | 3/1992 | Chiu et al. |
| 5,117,225 | A | 5/1992 | Wang |
| 5,210,789 | A | 5/1993 | Jeffus et al. |
| 5,239,460 | A | 8/1993 | LaRoche |
| 5,241,625 | A | 8/1993 | Epard et al. |
| 5,267,865 | A | 12/1993 | Lee et al. |
| 5,299,260 | A | 3/1994 | Shaio |
| 5,311,422 | A | 5/1994 | Loftin et al. |
| 5,315,711 | A | 5/1994 | Barone et al. |
| 5,317,628 | A | 5/1994 | Misholi et al. |
| 5,347,306 | A | 9/1994 | Nitta |
| 5,388,252 | A | 2/1995 | Dreste et al. |
| 5,396,371 | A | 3/1995 | Henits et al. |

(Continued)

FOREIGN PATENT DOCUMENTS

EP 0453128 A2 10/1991

(Continued)

OTHER PUBLICATIONS

"Customer Spotlight: Navistar International," Web pae, unverified print date of Apr. 1, 2002.

(Continued)

*Primary Examiner*—Daniel D Abebe
(74) *Attorney, Agent, or Firm*—Lawrence A. Aaronson, PC

(57) ABSTRACT

Systems and methods for analyzing communication sessions are provided. A representative method includes: recording the communication session; identifying those portions of the communication session not containing speech of at least one of the agent and the customer; and performing post-recording processing on the recording of the communication session based, at least in part, on whether the portions contain speech of at least one of the agent and the customer.

18 Claims, 4 Drawing Sheets

U.S. PATENT DOCUMENTS

| | | | |
|---|---|---|---|
| 5,432,715 | A | 7/1995 | Shigematsu et al. |
| 5,465,286 | A | 11/1995 | Clare et al. |
| 5,475,625 | A | 12/1995 | Glaschick |
| 5,485,569 | A | 1/1996 | Goldman et al. |
| 5,491,780 | A | 2/1996 | Fyles et al. |
| 5,499,291 | A | 3/1996 | Kepley |
| 5,526,407 | A | 6/1996 | Russell et al. |
| 5,535,256 | A | 7/1996 | Maloney et al. |
| 5,572,652 | A | 11/1996 | Robusto et al. |
| 5,577,112 | A | 11/1996 | Cambray et al. |
| 5,590,171 | A | 12/1996 | Howe et al. |
| 5,597,312 | A | 1/1997 | Bloom et al. |
| 5,619,183 | A | 4/1997 | Ziegra et al. |
| 5,696,906 | A | 12/1997 | Peters et al. |
| 5,717,879 | A | 2/1998 | Moran et al. |
| 5,721,842 | A | 2/1998 | Beasley et al. |
| 5,742,670 | A | 4/1998 | Bennett |
| 5,748,499 | A | 5/1998 | Trueblood |
| 5,778,182 | A | 7/1998 | Cathey et al. |
| 5,784,452 | A | 7/1998 | Carney |
| 5,790,798 | A | 8/1998 | Beckett, II et al. |
| 5,796,952 | A | 8/1998 | Davis et al. |
| 5,809,247 | A | 9/1998 | Richardson et al. |
| 5,809,250 | A | 9/1998 | Kisor |
| 5,825,869 | A | 10/1998 | Brooks et al. |
| 5,835,572 | A | 11/1998 | Richardson, Jr. et al. |
| 5,862,330 | A | 1/1999 | Anupam et al. |
| 5,864,772 | A | 1/1999 | Alvarado et al. |
| 5,884,032 | A | 3/1999 | Bateman et al. |
| 5,907,680 | A | 5/1999 | Nielsen |
| 5,918,214 | A | 6/1999 | Perkowski |
| 5,923,746 | A | 7/1999 | Baker et al. |
| 5,933,811 | A | 8/1999 | Angles et al. |
| 5,944,791 | A | 8/1999 | Scherpbier |
| 5,948,061 | A | 9/1999 | Merriman et al. |
| 5,958,016 | A | 9/1999 | Chang et al. |
| 5,964,836 | A | 10/1999 | Rowe et al. |
| 5,978,648 | A | 11/1999 | George et al. |
| 5,982,857 | A | 11/1999 | Brady |
| 5,987,466 | A | 11/1999 | Greer et al. |
| 5,990,852 | A | 11/1999 | Szamrej |
| 5,991,373 | A | 11/1999 | Pattison et al. |
| 5,991,796 | A | 11/1999 | Anupam et al. |
| 6,005,932 | A | 12/1999 | Bloom |
| 6,009,429 | A | 12/1999 | Greer et al. |
| 6,014,134 | A | 1/2000 | Bell et al. |
| 6,014,647 | A | 1/2000 | Nizzari et al. |
| 6,018,619 | A | 1/2000 | Allard et al. |
| 6,035,332 | A | 3/2000 | Ingrassia et al. |
| 6,038,544 | A | 3/2000 | Machin et al. |
| 6,039,575 | A | 3/2000 | L'Allier et al. |
| 6,057,841 | A | 5/2000 | Thurlow et al. |
| 6,058,163 | A | 5/2000 | Pattison et al. |
| 6,061,798 | A | 5/2000 | Coley et al. |
| 6,072,860 | A | 6/2000 | Kek et al. |
| 6,076,099 | A | 6/2000 | Chen et al. |
| 6,078,894 | A | 6/2000 | Clawson et al. |
| 6,091,712 | A | 7/2000 | Pope et al. |
| 6,108,711 | A | 8/2000 | Beck et al. |
| 6,122,665 | A | 9/2000 | Bar et al. |
| 6,122,668 | A | 9/2000 | Teng et al. |
| 6,130,668 | A | 10/2000 | Stein |
| 6,138,139 | A | 10/2000 | Beck et al. |
| 6,144,991 | A | 11/2000 | England |
| 6,146,148 | A | 11/2000 | Stuppy |
| 6,151,622 | A | 11/2000 | Fraenkel et al. |
| 6,154,771 | A | 11/2000 | Rangan et al. |
| 6,157,808 | A | 12/2000 | Hollingsworth |
| 6,171,109 | B1 | 1/2001 | Ohsuga |
| 6,182,094 | B1 | 1/2001 | Humpleman et al. |
| 6,195,679 | B1 | 2/2001 | Bauersfeld et al. |
| 6,201,948 | B1 | 3/2001 | Cook et al. |
| 6,211,451 | B1 | 4/2001 | Tohgi et al. |
| 6,225,993 | B1 | 5/2001 | Lindblad et al. |
| 6,230,197 | B1 | 5/2001 | Beck et al. |
| 6,236,977 | B1 | 5/2001 | Verba et al. |
| 6,244,758 | B1 | 6/2001 | Solymar et al. |
| 6,282,548 | B1 | 8/2001 | Burner et al. |
| 6,286,030 | B1 | 9/2001 | Wenig et al. |
| 6,286,046 | B1 | 9/2001 | Bryant |
| 6,288,753 | B1 | 9/2001 | DeNicola et al. |
| 6,289,340 | B1 | 9/2001 | Puram et al. |
| 6,301,462 | B1 | 10/2001 | Freeman et al. |
| 6,301,573 | B1 | 10/2001 | McIlwaine et al. |
| 6,324,282 | B1 | 11/2001 | McIllwaine et al. |
| 6,347,374 | B1 | 2/2002 | Drake et al. |
| 6,351,467 | B1 | 2/2002 | Dillon |
| 6,353,851 | B1 | 3/2002 | Anupam et al. |
| 6,360,250 | B1 | 3/2002 | Anupam et al. |
| 6,370,574 | B1 | 4/2002 | House et al. |
| 6,404,857 | B1 | 6/2002 | Blair et al. |
| 6,411,989 | B1 | 6/2002 | Anupam et al. |
| 6,418,471 | B1 | 7/2002 | Shelton et al. |
| 6,459,787 | B2 | 10/2002 | McIllwaine et al. |
| 6,487,195 | B1 | 11/2002 | Choung et al. |
| 6,493,758 | B1 | 12/2002 | McLain |
| 6,502,131 | B1 | 12/2002 | Vaid et al. |
| 6,510,220 | B1 | 1/2003 | Beckett, II et al. |
| 6,535,909 | B1 | 3/2003 | Rust |
| 6,542,602 | B1 | 4/2003 | Elazar |
| 6,546,405 | B2 | 4/2003 | Gupta et al. |
| 6,560,328 | B1 | 5/2003 | Bondarenko et al. |
| 6,583,806 | B2 | 6/2003 | Ludwig et al. |
| 6,606,657 | B1 | 8/2003 | Zilberstein et al. |
| 6,665,644 | B1 | 12/2003 | Kanevsky et al. |
| 6,674,447 | B1 | 1/2004 | Chiang et al. |
| 6,683,633 | B2 | 1/2004 | Holtzblatt et al. |
| 6,697,858 | B1 | 2/2004 | Ezerzer et al. |
| 6,724,887 | B1 | 4/2004 | Eilbacher et al. |
| 6,738,456 | B2 | 5/2004 | Wrona et al. |
| 6,757,361 | B2 | 6/2004 | Blair et al. |
| 6,772,396 | B1 | 8/2004 | Cronin et al. |
| 6,775,377 | B2 | 8/2004 | McIllwaine et al. |
| 6,792,575 | B1 | 9/2004 | Samaniego et al. |
| 6,810,414 | B1 | 10/2004 | Brittain |
| 6,820,083 | B1 | 11/2004 | Nagy et al. |
| 6,823,384 | B1 | 11/2004 | Wilson et al. |
| 6,870,916 | B2 | 3/2005 | Henrikson et al. |
| 6,901,438 | B1 | 5/2005 | Davis et al. |
| 6,959,078 | B1 | 10/2005 | Eilbacher et al. |
| 6,965,886 | B2 | 11/2005 | Govrin et al. |
| 7,076,051 | B2 | 7/2006 | Brown et al. |
| 7,295,970 | B1 * | 11/2007 | Gorin et al. ................. 704/221 |
| 2001/0000962 | A1 | 5/2001 | Rajan |
| 2001/0032335 | A1 | 10/2001 | Jones |
| 2001/0043697 | A1 | 11/2001 | Cox et al. |
| 2002/0038363 | A1 | 3/2002 | MacLean |
| 2002/0052948 | A1 | 5/2002 | Baudu et al. |
| 2002/0065911 | A1 | 5/2002 | Von Klopp et al. |
| 2002/0065912 | A1 | 5/2002 | Catchpole et al. |
| 2002/0128925 | A1 | 9/2002 | Angeles |
| 2002/0143925 | A1 | 10/2002 | Pricer et al. |
| 2002/0165954 | A1 | 11/2002 | Eshghi et al. |
| 2003/0055883 | A1 | 3/2003 | Wiles et al. |
| 2003/0079020 | A1 | 4/2003 | Gourraud et al. |
| 2003/0144900 | A1 | 7/2003 | Whitmer |
| 2003/0154240 | A1 | 8/2003 | Nygren et al. |
| 2004/0100507 | A1 | 5/2004 | Hayner et al. |
| 2004/0165717 | A1 | 8/2004 | Mcllwaine et al. |
| 2004/0249650 | A1 * | 12/2004 | Freedman et al. .............. 705/1 |
| 2005/0013560 | A1 | 1/2005 | Mazotti et al. |
| 2006/0198504 | A1 | 9/2006 | Shemisa et al. |
| 2006/0265089 | A1 * | 11/2006 | Conway et al. ............... 700/94 |
| 2006/0289622 | A1 * | 12/2006 | Khor et al. .................. 235/375 |

| | | | | |
|---|---|---|---|---|
| 2007/0297577 | A1* | 12/2007 | Wyss | 379/67.1 |
| 2008/0037719 | A1* | 2/2008 | Doren | 379/85 |
| 2008/0260122 | A1* | 10/2008 | Conway et al. | 379/112.01 |

FOREIGN PATENT DOCUMENTS

| | | | |
|---|---|---|---|
| EP | 0773687 | A2 | 5/1997 |
| EP | 0989720 | | 3/2000 |
| GB | 2369263 | | 5/2002 |
| WO | WO 98/43380 | | 11/1998 |
| WO | WO 00/16207 | | 3/2000 |

OTHER PUBLICATIONS

"DKSystems Integrates QM Perception with OnTrack for Training," Web page, unvereified print date of Apr. 1, 2002, unverified cover date of Jun. 15, 1999.
"OnTrack Online" Delivers New Web Functionality, Web page, unverified print date of Apr. 2, 2002, unverified cover date of Oct. 5, 1999.
"Price WaterouseCoopers Case Study" The Business Challenge, Web page, unverified cover date of 2000.
Abstract, net.working: "An Online Webliography," *Technical Training* pp. 4-5 (Nov.-Dec. 1998).
Adams et al., "Our Turn-of-the-Century Trend Watch" *Technical Training* pp. 46-47 (Nov./Dec. 1998).
Barron, "The Road to Performance: Three Vignettes," *Technical Skills and Training* pp. 12-14 (Jan. 1997).
Bauer, "Technology Tools: Just-in-Time Desktop Training is Quick, Easy, and Affordable," *Technical Training* pp. 8-11 (May/Jun. 1998).
Beck et al., "Applications of A1 in Education," *AMC Crossroads* vol. 1: 1-13 (Fall 1996) Web page, unverified print date of Apr. 12, 2002.
Benson and Cheney, "Best Practices in Training Delivery," *Technical Training* pp. 14-17 (Oct. 1996).
Bental and Cawsey, "Personalized and Adaptive Systems for Medical Consumer Applications," Communications ACM 45(5): 62-63 (May 2002).
Benyon and Murray, "Adaptive Systems: from intelligent tutoring to autonomous agents," pp. 1-52, Web page, unknown date.
Blumenthal et al., "Reducing Development Costs with Intelligent Tutoring System Shells," pp. 1-5, Web page, unverified print date of Apr. 9, 2002, unverified cover date of Jun. 10, 1996.
Brusilosy et al., "Distributed intelligent tutoring on the Web," Proceedings of the 8$^{th}$ World Conference of the AIED Society, Kobe, Japan, Aug. 18-22, pp. 1-9 Web page, unverified print date of Apr. 12, 2002, unverified cover date of Aug. 18-22, 1997.
Brusilovsky and Pesin, ISIS-Tutor: An Intelligent Learning Environment for CD/ISIS Users, @ pp. 1-15 Web page, unverified print date of May 2, 2002.
Brusilovsky, "Adaptive Educational Systems on the World-Wide-Web: A Review of Available Technologies," pp. 1-10, Web Page, unverified print date of Apr. 12, 2002.
Byrnes et al., "The Development of a Multiple-Choice and True-False Testing Environment on the Web," pp. 1-8, Web page, unverified print date of Apr. 12, 2002, unverified cover date of 1995.
Calvi and DeBra, "Improving the Usability of Hypertext Courseware through Adaptive Linking," *ACM*, unknown page numbers (1997).
Coffey, "Are Performance Objectives Really Necessary?" *Technical Skills and Training* pp. 25-27 (Oct. 1995).
Cohen, "Knowledge Management's Killer App," pp. 1-11, Web page, unverified print date of Sep. 12, 2002, unverified cover date of 2001.
Cole-Gomolski, "New Ways to manage E-Classes," *Computerworld* 32(48):4344 (Nov. 30, 1998).
Cross: "Sun Microsystems—The SunTAN Story," Internet Time Group 8 (© 2001).
De Bra et al., "Adaptive Hypermedia: From Systems to Framework," *ACM* (2000).
De Bra, "Adaptive Educational Hypermedia on the Web," *Communications ACM* 45(5):60-61 (May 2002).
Dennis and Gruner, "Computer Managed Instruction at Arthur Andersen & Company: A Status Report," *Educational Technical* pp. 7-16 (Mar. 1992).
Diessel et al., "Individualized Course Generation: A Marriage Between CAL and ICAL," *Computers Educational* 22(1/2) 57-65 (1994).
Dyreson, "An Experiment in Class Management Using the World-Wide Web," pp. 1-12, Web page, unverified print date of Apr. 12, 2002.
E Learning Community, "Excellence in Practice Award: Electronic Learning Technologies," *Personal Learning Network* pp. 1-11, Web page, unverified print date of Apr. 12, 2002.
Eklund and Brusilovsky, "The Value of Adaptivity in Hypermedia Learning Environments: A Short Review of Empirical Evidence," pp. 1-8, Web page, unverified print date of May 2, 2002.
*e-Learning the future of learning*, THINQ Limited, London, Version 1.0 (2000).
Eline, "A Trainer's Guide to Skill Building," *Technical Training* pp. 34-41 (Sep./Oct. 1998).
Eline, "Case Study: Briding the Gap in Canada's IT Skills," *Technical Skills and Training* pp. 23-25 (Jul. 1997).
Eline "Case Study: IBT's Place in the Sun," *Technical Training* pp. 12-17 (Aug./Sep. 1997).
Fritz, "CB templates for productivity: Authoring system templates for trainers," *Emedia Professional* 10(8):6678 (Aug. 1997).
Fritz, "ToolBook II: Asymetrix's updated authoring software tackles the Web," *Emedia Professional* 10(20): 102106 (Feb. 1997).
Gibson et al., "A Comparative Analysis of Web-Based Testing and Evaluation Systems," pp. 1-8, Web page, unverified print date of Apr. 11, 2002.
Halberg and DeFiore, "Curving Toward Performance: Following a Hierarchy of Steps Toward a Performance Orientation," *Technical Skills and Training* pp. 9-11 (Jan. 1997).
Harsha, "Online Training 'Sprints' Ahead," *Technical Training* pp. 27-29 (Jan./Feb. 1999).
Heideman, "Training Technicians for a High-Tech Future: These six steps can help develop technician training for high-tech work," pp. 11-14 (Feb./Mar. 1995).
Heideman, "Writing Performance Objectives Simple as A-B-C (and D)," *Technical Skills and Training* pp. 5-7 (May/Jun. 1996).
Hollman, "Train Without Pain: The Benefits of Computer-Based Training Tools," pp. 1-11, Web page, unverified print date of Mar. 20, 2002, unverified cover date of Jan. 1, 2000.
Klein, "Command Decision Training Support Technology," Web page, unverified print date of Apr. 12, 2002.
Koonce, "Where Technology and Training Meet," *Technical Training* pp. 10-15 (Nov./Dec. 1998).
Kursh, "Going the distance with Web-based training," *Training and Development* 52(3): 5053 (Mar. 1998).
Larson, "Enhancing Performance Through Customized Online Learning Support," *Technical Skills and Training* pp. 25-27 (May/Jun. 1997).
Linton, et al. "OWL: A Recommender System for Organization-Wide Learning," *Educational Technical Society* 3(1): 62-76 (2000).
Lucadamo and Cheney, "Best Practices in Technical Training," *Technical Training* pp. 21-26 (Oct. 1997).
McNamara, "Monitoring Solutions: Quality Must be Seen and Heard," *Inbound/Outbound* pp. 66-67 (Dec. 1989).
Merrill, "The New Component Design Theory: Instruction design for courseware authoring," *Instructional Science* 16:19-34 (1987).
Minton-Eversole, "IBT Training Truths Behind the Hype," *Technical Skills and Training* pp. 15-19 (Jan. 1997).
Mizoguchi, "Intelligent Tutoring Systems: The Current State of the Art," Trans. IEICE E73(3):297-307 (Mar. 1990).
Mostow and Aist, "The Sounds of Silence: Towards Automated Evaluation of Student Learning a Reading Tutor that Listens" *American Association for Artificial Intelligence*, Web page, unknown date Aug. 1997.
Mullier et al., "A Web base Intelligent Tutoring System," pp. 1-6, Web page, unverified print date of May 2, 2002.
Nash, Database Marketing, 1993, pp. 158-165, 172-185, McGraw Hill, Inc. USA.
Nelson et al. "The Assessment of *End-User Training Needs," Communications ACM* 38(7):27-39 (Jul. 1995).

O'Herron, "CenterForce Technologies' CenterForce Analyzer," Web page unverified print date of Mar. 2, 2002, unverified cover date of Jun. 1, 1999.
O'Roark, "Basic Skills Get a Boost," Technical Training pp. 10-13 (Jul./Aug. 1998).
Pamphlet, On Evaluating Educational Innovations[1] , authored by Alan Lesgold, unverified cover date of Mar. 5, 1998.
Papa et al., "A Differential Diagnostic Skills Assessment and Tutorial Tool," *Computer Education* 18(1-3):45-50 (1992).
PCT International Search Report, International Application No. PCT/US03/02541, mailed May 12, 2003.
Phaup, "New Software Puts Computerized Tests on the Internet: Presence Corporation announces breakthrough Question Mark™ Web Product," Web page, unverified print date of Apr. 1, 2002.
Phaup, "QM Perception™ Links with Integrity Training's WBT Manager™ to Provide Enhanced Assessments of Web-Based Courses," Web page, unverified print date of Apr. 1, 2002, unverified cover date of Mar. 25, 1999.
Phaup, "Question Mark Introduces Access Export Software," Web page, unverified print date of Apr. 2, 2002, unverified cover date of Mar. 1, 1997.
Phaup, "Question Mark Offers Instant Online Feedback for Web Quizzes and Questionnaires: University of California assist with Beta Testing, Server scripts now available on high-volume users," Web page, unverified print date of Apr. 1, 2002, unverified cover date of May 6, 1996.
Piskurich, Now-You-See-'Em, Now-You-Don't Learning Centers, *Technical Training* pp. 18-21 (Jan./Feb. 1999).
Phaup, "Question Mark Offers Instant Online Feedback for Web Quizzes and Questionnaires: University of California assist with Beta Testing, Server scripts now available on high-volume users," Web page, unverified print date of Apr. 1, 2002, unverified cover date of May 6, 1996.
Reid, "On Target: Assessing Technical Skills," *Technical Skills and Training* pp. 6-8 (May/Jun. 1995).
Stormes, "Case Study: Restructuring Technical Training Using ISD," *Technical Skills and Training* pp. 23-26 (Feb./Mar. 1997).
Tennyson, "Artificial Intelligence Methods in Computer-Based Instructional Design," Journal of Instructional Development 7(3): 17-22 (1984).
The Editors, Call Center, "The Most Innovative Call Center Products We Saw in 1999," Web page, unverified print date of Mar. 20, 2002, unverified cover date of Feb. 1, 2000.
Tinoco et al., "Online Evaluation in WWW-based Courseware," *ACM* pp. 194-198 (1997).
Uiterwijk et al., "The virtual classroom," *Info World* 20(47):6467 (Nov. 23, 1998).
Unknown Author, "Long-distance learning," *InfoWorld* 20(36):7676 (1998).
Untitled, 10$^{th}$ Mediterranean Electrotechnical Conference vol. 1 pp. 124-126 (2000).
Watson and Belland, "Use of Learner Data in Selecting Instructional Content for Continuing Education," *Journal of Instructional Development* 8(4):29-33 (1985).
Weinschenk, "Performance Specifications as Change Agents," *Technical Training* pp. 12-15 (Oct. 1997).
Witness Systems promotional brochure for eQuality entitled "Building Customer Loyalty Through Business-Driven Recording of Multimedia Interactions in your Contact Center," (2000).
Aspect Call Center Product Specification, "Release 2.0", Aspect Telecommuications Corporation, May 23, 1998 798.
Metheus X Window Record and Playback, XRP Features and Benefits, 2 pages Sep. 1994 LPRs.
"Keeping an Eye on Your Agents," Call Center Magazine, pp. 32-34, Feb. 1993 LPRs & 798.
Anderson: Interactive TVs New Approach, The Standard, Oct. 1, 1999.
Ante, *Everything You Ever Wanted to Know About Cryptography Legislation . . .* (*But Were to Sensible to Ask*), PC world Online, Dec. 14, 1999.
Berst. *It's Baa-aack. How Interative TV is Sneaking Into Your Living Room*, The AnchorDesk, May 10, 1999.
Berst. *Why Interactive TV Won't Turn You On* (*Yet*), The AnchorDesk, Jul. 13, 1999.
Borland and Davis. *US West Plans Web Services on TV*, CNETNews.com, Nov. 22, 1999.
Brown. *Let PC Technology Be Your TV Guide*, PC Magazine, Jun. 7, 1999.
Brown. *Interactive TV: The Sequel*, NewMedia, Feb. 10, 1998.
Cline. Déjà vu—*Will Interactive TV Make It This Time Around*?, DevHead, Jul. 9, 1999.
Crouch. *TV Channels on the Web*, PC World, Sep. 15, 1999.
D'Amico. *Interactive TV Gets $99 set-top box*, IDG.net, Oct. 6, 1999.
Davis. *Satellite Systems Gear Up for Interactive TV Fight*, CNETNews.com, Sep. 30, 1999.
Diederich. *Web TV Data Gathering Raises Privacy Concerns*, ComputerWorld, Oct. 13, 1998.
*EchoStar, MediaX Mix Interactive Multimedia With Interactive Television*, PRNews Wire, Jan. 11, 1999.
Furger. *The Internet Meets the Couch Potato*, PCWorld, Oct. 1996.
*Hong Kong Comes First with Interactive TV*, Sci-Tech, Dec. 4, 1997.
Needle. *Will the Net Kill Network TV*? PC World Online, Mar. 10, 1999.
Kane. *AOL-Tivo: You've Got Interactive TV*, ZDNN, Aug. 17, 1999.
Kay. *E-Mail in Your Kitchen*, PC World Online, Sep. 28, 1996.
Kenny. *TV Meets Internet*, PC World Online, Mar. 28, 1996.
Linderholm. *Avatar Debuts Home Theater PC, PC* World Online, Dec. 1, 1999.
Rohde. *Gates Touts Interactive TV*, InfoWorld, Oct. 14, 1999.
Ross. *Broadcasters Use TV Signals to Send Data*, PC World Oct. 1996.
Stewart. *Interactive Television at Home: Television Meets the Internet*, Aug. 1998.
Wilson. *U.S. West Revisits Interactive TV*, Interactive Week, Nov. 28, 1999.
Notification of Transmittal of the International Search Report and the Written Opinion of the International Searching Authority, dated Jan. 29, 2008.
Glass, J., Chang, J. and McCandless, M., 1996, A probabilistic framework for feature-based speech recognition [online]. ICSLP Philadelphia, PA, pp. 2277-2280, Oct. 1996 [retrieved Dec. 18, 2007]. Retrieved from the Internet: http://groups.csail.mit.edu/sls/publications/1996/icslp96-summit.pdf, p. 2, paragraph 8.
Notification Concerning Transmittal of International Preliminary Report on Patentability and Written Opinion of the International Searching Authority, dated Apr. 9, 2009.

* cited by examiner

SYSTEMS AND METHODS FOR ANALYZING COMMUNICATION SESSIONS

TECHNICAL FIELD

The present disclosure generally relates to analysis of communication sessions.

DESCRIPTION OF THE RELATED ART

Contact centers are staffed by agents who are trained to interact with customers. Although capable of conducting these interactions using various media, the most common scenario involves voice communications using telephones. In this regard, when a customer contacts a contact center by phone, the call is typically provided to an automated call distributor (ACD) that is responsible for routing the call to an appropriate agent. Prior to an agent receiving the call, however, the call can be placed on hold by the ACD for a variety of reasons. By way of example, the ACD can enable an interactive voice response system (IVR) to query the user for information so that an appropriate queue for handling the call can be determined. As another example, the ACD can place the call on hold until an agent is available for handling the call. In such an on hold period, music (which is referred to as "music on hold") and/or various announcements (which can be prerecorded or use synthetic human voices) can be provided to the customer.

For a number of reasons, such as compliance regulations, it is commonplace to record communication sessions. Notably, an entire call (including on hold periods) can be recorded. However, a significant portion of such a recording can be attributed to music on hold, announcements and/or IVR queries that do not tend to provide substantive information for analysis.

SUMMARY

In this regard, systems and methods for analyzing communication sessions are provided. An exemplary embodiment of such a system comprises a voice analysis system that is operative to receive information corresponding to a communication session and perform post-recording processing on the information. The voice analysis system is configured to exclude a portion of the information corresponding to the communication session, that is not attributable to speech of at least one party of the communication session, from post-recording processing.

An exemplary embodiment of a method for analyzing communication sessions comprises excluding a portion of the communication session, not attributable to at least one party of the communication session, from post-recording processing.

Another exemplary embodiment of a method for analyzing communication sessions comprises: recording the communication session; identifying those portions of the communication session not containing speech of at least one of the agent and the customer; and performing post-recording processing on the recording of the communication session based, at least in part, on whether the portions contain speech of at least one of the agent and the customer.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

DETAILED DESCRIPTION

As will be described in detail here with reference to several exemplary embodiments, systems and methods for analyzing communication sessions can potentially enhance post-recording processing of communication sessions. In this regard, it is known that compliance recording and/or recording of communication sessions for other purposes involves recording various types of information that are of relatively limited substantive use. By way of example, music, announcements and/or queries by IVR systems commonly are recorded. Such information can cause problems during post-recording processing in that these types of information can make it difficult for accurate processing by speech recognition and phonetic analysis systems. Additionally, since such information affords relatively little substantive value, inclusion of such information tends to use recording resources, i.e., the information takes up space in memory, thereby incurring cost without providing corresponding value.

Figure 1:
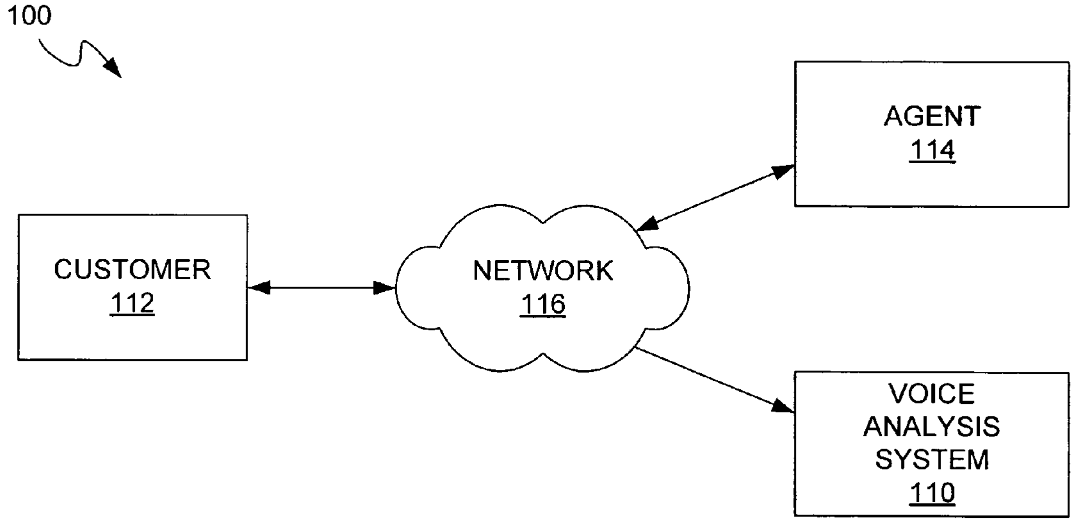
FIG. 1 is a schematic diagram illustrating an embodiment of a system for analyzing communication sessions.

Referring now to FIG. 1, FIG. 1 depicts an exemplary embodiment of a system for analyzing communication sessions that incorporates a voice analysis system 102. Voice analysis system 102 receives information corresponding to a communication session, such as a session occurring between a customer 104 and an agent 106 via a communication network 108. As a non-limiting, example, communications network 108 can include a Wide Area Network (WAN), the Internet and/or a Local Area Network (LAN). In some embodiments, the voice analysis system can receive the information corresponding to the communication session from a data storage device, e.g., a hard drive, that is storing a recording of the communication session.

Figure 2:
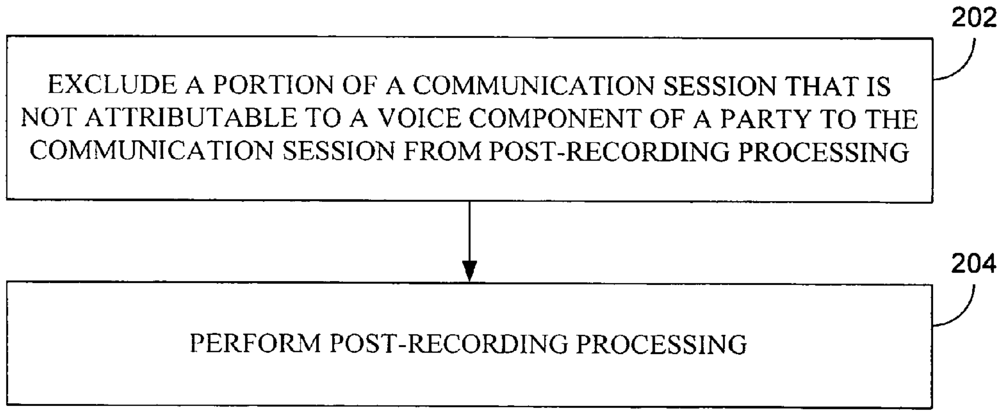
FIG. 2 is a flowchart depicting functionality (or method steps) associated with an embodiment of a system for analyzing communication sessions.

FIG. 2 depicts the functionality (or method) associated with an embodiment of a system for analyzing communications, such as the embodiment of FIG. 1. In this regard, the depicted functionality involves excluding a portion of a communication session from post-recording processing (block 202). That is, information that does not correspond to a voice component of a party to the communication session, e.g., the agent and the customer, can be excluded. Notably, various types of information, such as music, announcements and/or queries of an IVR system are not attributable to one of the parties. As such, these types of information can be excluded from post-recording processing (block 204), which can involve speech recognition and/or phonetic analysis.

In some embodiments, information that does not correspond to a voice component of any party to the communication session is deleted from the recording of the communication session. As another example, such information could be identified and any post-recording processing algorithms could ignore those portions, thereby enabling processing resources to be devoted to analyzing other portions of the recordings.

As a further example, at least with respect to announcements and queries from IVR systems that involve pre-recorded or synthetic human voices (i.e., computer generated voices), information regarding those audio components can be provided to the post-recording processing algorithms so that analysis can be accomplished efficiently. In particular, if the processing system has knowledge of the actual words that are being spoken in those audio components, the processing algorithm can more quickly and accurately convert those audio components to transcript form (as in the case of speech recognition) or to phoneme sequences (as in the case of phonetic analysis).

Figure 3:
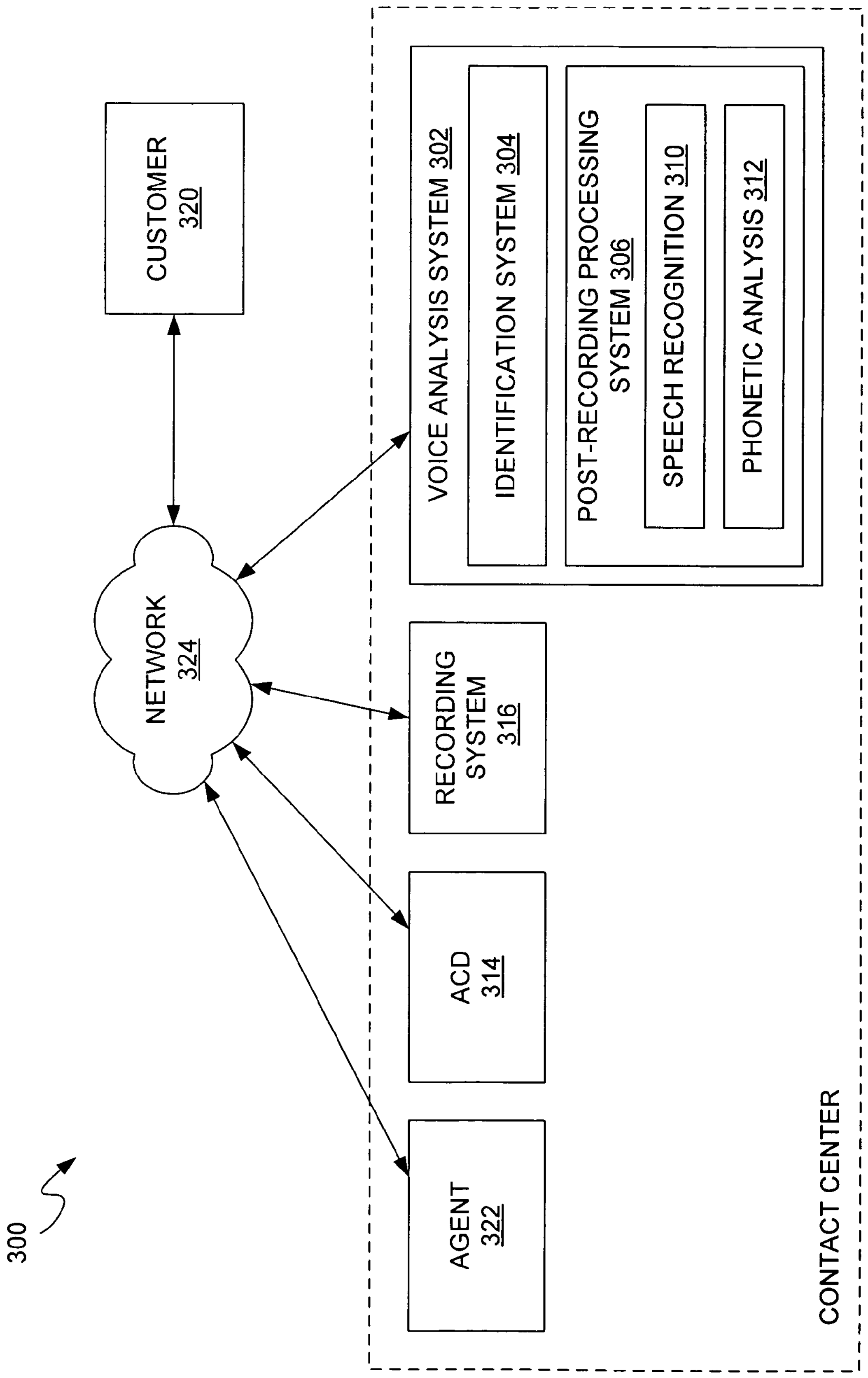
FIG. 3 is a schematic diagram illustrating another embodiment of a system for analyzing communication sessions.

FIG. 3 depicts another exemplary embodiment of a system for analyzing communication sessions. In this regard, system 300 is implemented in a contact center environment that includes a voice analysis system 302. Voice analysis system 302 incorporates an identification system 304 and a post-recording processing system 306. The post-recording processing system incorporates a speech recognition system 310 and a phonetic analysis system 312.

The contact center also incorporates an automated call distributor (ACD) 314 that facilitates routing of a call between the customer and the agent. The communication session is recorded by a recording system 316 that is able to provide information corresponding to the communication session to the voice analysis system for analysis.

In operation, the voice analysis system receives information corresponding to a communication session that occurs between a customer 320 and an agent 322, with the session occurring via a communication network 324. Specifically, the ACD routes the call so that the customer and agent can interact and the recorder records the communication session.

With respect to the voce analysis system 302, the identification system 304 analyzes the communication session (e.g., from the recording) to determine whether post-recording processing should be conducted with respect to each of the recorded portions of the session. Based on the determinations, which can be performed in various manners (examples of which are described in detail later), processing can be performed by the post-recording processing system 306. By way of example, the embodiment of FIG. 3 includes both a speech recognition system and a phonetic analysis system that can be used either individually or in combination to process portions of the communication session.

Notably, the ACD 314 can be responsible for providing various announcements to the customer. In some embodiments, these announcements can be provided via synthetic human voices and/or recordings. It should be noted that other types of announcements can be present in recordings that are not provided by an ACD. By way of example, a telephone central office can introduce announcements that could be recorded. As another example, voice mail systems can provide announcements. The principles described herein relating to treatment of ACD announcements are equally applicable to such other forms of announcements regardless of the manner in which the announcements become associated with a recording.

Additionally or alternatively, the ACD can facilitate interaction of the customer with an IVR system that queries the customer for various information. Additionally or alternatively, the ACD can provide music on hold, such as when the call is queued awaiting pickup by an agent. It should be noted that other types of music can be present in recordings that are not provided by an ACD. By way of example, a customer could be speaking to an agent when music is being played in the background. The principles described herein relating to treatment of ACD music on hold are equally applicable to such other forms of music regardless of the manner in which the music becomes associated with a recording.

Figure 4:
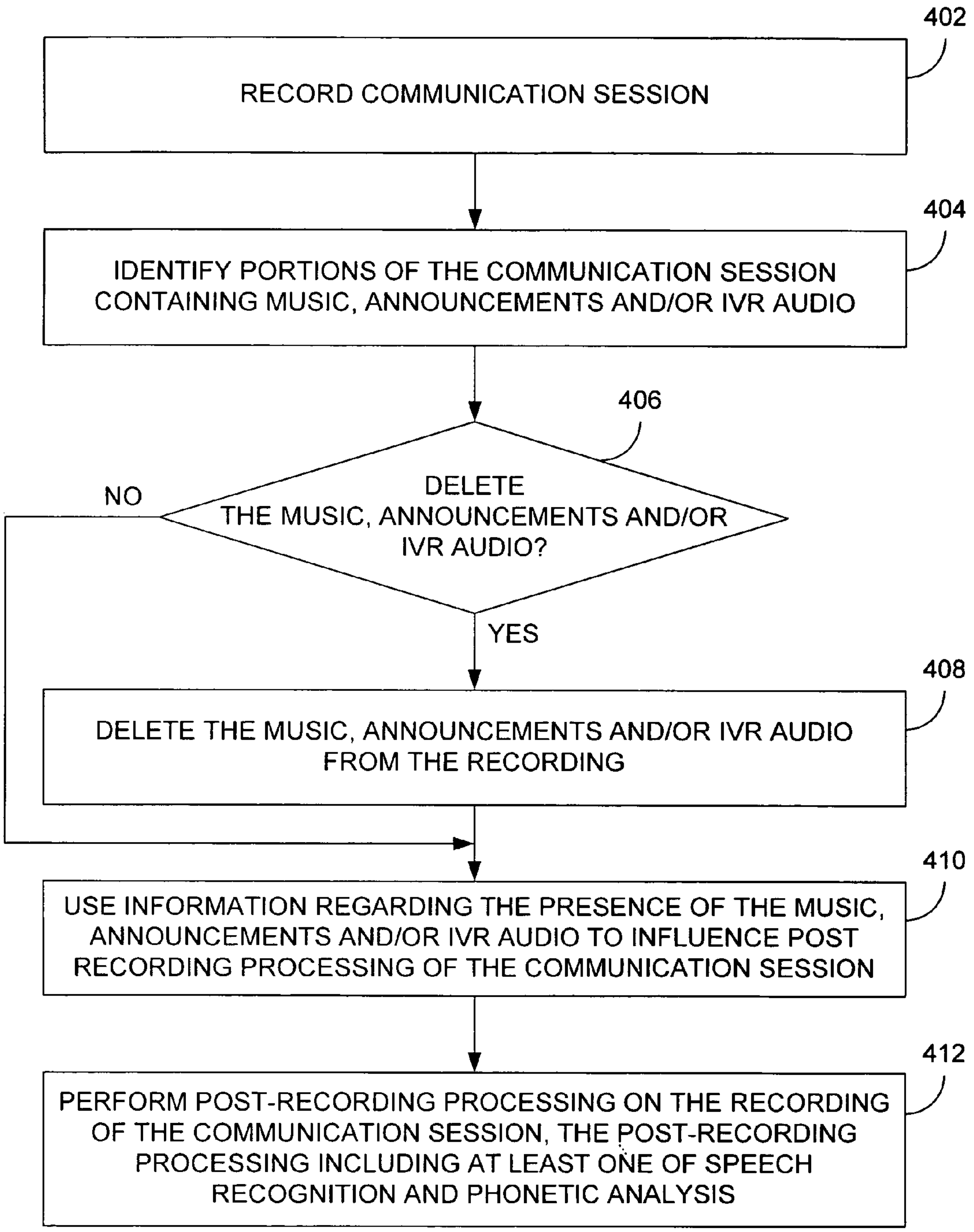
FIG. 4 is a flowchart depicting functionality (or method steps) associated with an embodiment of a system for analyzing communication sessions.
Figure 5:
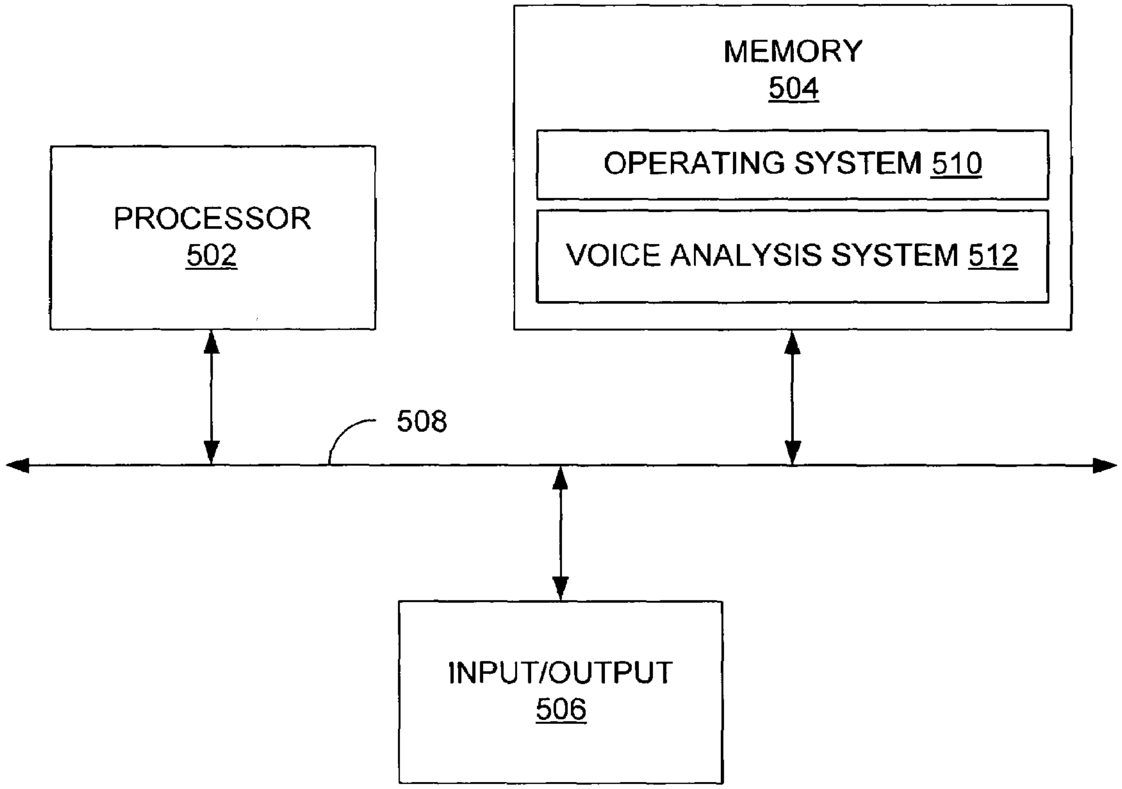
FIG. 5 is a schematic diagram of an embodiment of a system for analyzing communication sessions that is implemented by a computer.

FIG. 4 is a flowchart depicting functionality of an embodiment of a system for analyzing communication sessions, such as the system depicted in FIG. 3. In this regard, the functionality (or method steps) may be construed as beginning at block 402, in which a communication session is recorded. In block 404, portions of the communication session are identified as containing music, announcements and/or IVR audio. Then, as depicted in block 406, a determination is made as to whether the music, announcements and/or IVR audio that were identified are to be deleted from the recording. If it is determined that the music, announcements and/or IVR audio are to be deleted, the process proceeds to block 408, in which deletion from the recording is performed. The the process proceeds to block 410. If, however, it is determined that the music, announcements and/or IVR audio are not to be deleted, the process also proceeds to block 410.

In block 410, information regarding the presence of the music, announcements and/or IVR audio is used to influence post-recording processing of a communication session. By way of example, the corresponding portions of the recording can be designated or otherwise flagged with information indicating that music, announcements and/or IVR audio is present. Other manners in which such a post-recording process can be influenced will be described in greater detail later.

Thereafter, the process proceeds to block 412, in which post-recording processing is performed. In particular, such post-recording processing can include at least one of speech recognition and phonetic analysis.

With respect to the identification of various portions of a communication session, a voice analysis system can be used to distinguish those portions of a communication session that include voice components of a party to the communication from other audio components. Depending upon the particular embodiment, such a voice analysis system could identify the voice components of the parties as being suitable for both post-recording analysis and/or could identify other portions as not being suitable for post-recording analysis.

In some embodiments, a voice analysis system is configured to identify dual tone multi-frequency (DTMF) tones, i.e., the sounds generated by a touch tone phone. In some of these embodiments, the tones can be removed from the recording. In removing such tones prior to speech recognition and/or phonetic analysis, such analysis may be more effective as the DTMF tones may no longer mask some of the recorded speech.

As an additional benefit, the desire for improved security of personal information may require in some circumstances that such DTMF tones not be stored or otherwise made available for later access. For instance, a customer responding to an IVR system query may input DTMF tones corresponding to a social security number or a bank account number. Clearly, recording such tones could increase the likelihood of this information being compromised. However, an embodiment of a voice analysis system that deletes these tones does not incur this potential liability.

In some embodiments, signaling tones, such as distant and local ring tones and busy equipment signals, can be identified. With respect to the identification of ring tones, identification of regional tones can provide additional information about a call that may be useful. By way of example, such tones could identify the region to which an agent placed a call while a customer was on hold. Moreover, once identified, the signaling tones can be removed from the recording of the communication session.

Regional identification of audio components also can occur in some embodiments with respect to announcements. In this regard, some regions provide unique announcements, such as those originating from a central telephone office. For example, in the United States an announcement may be as follows, "I am sorry, all circuits are busy. Please try your call again later." Identifying such an audio component in a recording could then inform a user that a party to the communication session attempted to place a call to the United States.

Various techniques can be used for differentiating the various portions of a communication session. In this regard, energy envelope analysis, which involves graphically displaying the amplitude of audio of a communication session, can be used to distinguish music from voice components. This is because music tends to follow established tempo patterns and oftentimes exhibits higher energy levels than voice components.

In some embodiments, such identification can be accomplished manually, semi-automatically or automatically. By way of example, a semi-automatic mode of identification can include providing a user with a graphical user interface that depicts an energy envelope corresponding to a communication session. The graphical user interface could then provide the user with a sliding window that can be used to identify contiguous portions of the communication session. In this regard, the sliding window can be altered to surround a portion of the recording that is identified, such as by listening to that portion, as music. The portion of the communication session that has been identified within such a sliding window as being attributable to music can then be automatically compared by the system to other portions of the recorded communication session. When a suitable match is automatically identified, each such portion also can be designated as being attributable to music.

Additionally or alternatively, some embodiments of a voice analyzer system can differentiate between announcements and tones that are regional in nature. This can be accomplished by comparing the recorded announcements and/or tones to a database of known announcements and tones to check for parity. Once designations are made about the portions of a communication sessions containing regional characteristics, the actual audio can be discarded or otherwise ignored during post-recording processing. In this manner, speech analysis does not need to be undertaken with respect to those portions of the audio, thereby allowing speech analysis systems to devote more time and resources to other portions of the communication session. Notably, however, the aforementioned designations can be retained in the records of the communication session so that information corresponding to the occurrence of such characteristics is not discarded.

In some embodiments, a database can be used for comparative purposes to identify variable announcements. That is an announcement that includes established fields, within which information can be changed. An example of such a variable announcement includes an airline reservation announcement that indicates current rate promotions. Such an announcement usually includes a fixed field identifying the airline and then variable fields identifying a destination and a fare. Knowledge of the first variable field involving a destination could be used to simplify post-recording processing in some embodiments, whereas other embodiments may avoid processing of that portion once a determination is made that the portion corresponds to an announcement. Alternatively, a hybrid approach could involve not processing of audio corresponding to fixed fields and allowing post-recording processing on the audio corresponding to the variable fields.

Another form of variable announcements relates to voicemail systems. In this regard, voicemail systems use variable fields to inform a caller that a voice message can be recorded. In some embodiments, these announcements can be identified and handled such as described before. One notable distinction, however, involves the use of the actual voicemail message that is left by a caller. If such a caller indicates that the message is "private," some embodiments can delete the message or otherwise avoid post-recording processing of the message.

FIG. 6 is a schematic diagram illustrating an embodiment of system for analyzing communication sessions that is implemented by a computer. Generally, in terms of hardware architecture, system 500 includes a processor 502, memory 504, and one or more input and/or output (I/O) devices interface(s) 506 that are communicatively coupled via a local interface 508. The local interface 506 can include, for example but not limited to, one or more buses or other wired or wireless connections. The local interface may have additional elements, which are omitted for simplicity, such as controllers, buffers (caches), drivers, repeaters, and receivers to enable communications.

Further, the local interface may include address, control, and/or data connections to enable appropriate communications among the aforementioned components. The processor may be a hardware device for executing software, particularly software stored in memory.

The memory can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory may incorporate electronic, magnetic, optical, and/or other types of storage media. Note that the memory can have a distributed architecture, where various components are situated remote from one another, but can be accessed by the processor. Additionally, the memory includes an operating system 510, as well as instructions associated with a voice analysis system 51, exemplary embodiments of which are described above.

One should note that the flowcharts included herein show the architecture, functionality and/or operation of a possible implementation of one or more embodiments that can be implemented in software and/or hardware. In this regard, each block can be interpreted to represent a module, segment, or portion of code, which comprises one or more executable instructions for implementing the specified logical functions. It should also be noted that in some alternative implementations, the functions noted in the blocks may occur out of the order in which depicted. For example, two blocks shown in succession may in fact be executed substantially concurrently or the blocks may sometimes be executed in the reverse order, depending upon the functionality involved.

One should note that any of the functions (such as depicted in the flowcharts) can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a nonexhaustive list) of the computer-readable medium could include an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). In addition, the scope of the certain embodiments of this disclosure can include embodying the functionality described in logic embodied in hardware or software-configured mediums.

It should be emphasized that many variations and modifications may be made to the above-described embodiments. All such modifications and variations are intended to be included herein within the scope of this disclosure and protected by the following claims.

The invention claimed is:

1. A method for analyzing communication sessions between an agent of a contact center and a customer, said method comprising:

recording the communication session at recording system executing on a computing device;

identifying, at an identification system, those portions of the communication session not containing speech of at least one of the agent and the customer;

identifying a presence of at least one of an announcement and audio from an interactive voice response (IVR) system;

performing post-recording processing comprises providing access to information corresponding to a database of potential announcements and potential audio from the IVR system such that the post-recording processing can analyze the at least one of the announcement and the audio using the database; and performing, at a computer-implemented post-processing system, post-recording processing on the recording of the communication session based, at least in part, on whether the portions contain speech of at least one of the agent and the customer.

2. The method of claim 1, wherein:

the method further comprises deleting the portions not attributable to at least one of the agent and the customer from the recording;

performing post recording processing comprises performing post-recording processing on the remaining portions.

3. The method of claim 1, wherein identifying comprises identifying presence of music in the communication session.

4. The method of claim 1, further comprising deleting audio from the recording corresponding to a private voicemail message.

5. A method for analyzing communication sessions comprising:

recording the communication sessions at recording system executing on a computing device;

identifying, at an identification system, a portion of the communication sessions not attributable to a voice component of at least one party of the communication session; and excluding the portion of the communication session, not attributable to a voice component of at least one party of the communication session, from post-recording processing, wherein the portion of the communication session comprises audio from an interactive voice response (IVR) system.

6. The method of claim 5, wherein the post recording processing comprises speech recognition processing.

7. The method of claim 5, wherein the post-recording processing comprises phonetic analysis.

8. The method of claim 5, wherein the portion of the communication session comprises music.

9. The method of claim 8, wherein the music comprises music on hold.

10. The method of claim 8, wherein the portion of the communication session comprises an announcement.

11. The method of claim 10, wherein the announcement comprises a synthetic human voice.

12. The method of claim 5, wherein the portion of the communication session comprises dual tone multi-frequency (DTMF) audio.

13. The method of claim 5, further comprising recording the communication session.

14. The method of claim 13, further comprising deleting the portion not attributable to the at least party from the recording.

15. The method of claim 5, wherein excluding comprises identifying portions of the communication session not attributable to the at least one party.

16. A system for analyzing communication sessions comprising:

a recording system operative to record a communication session; and a voice analysis system operative to receive information corresponding to the communication session and perform post-recording processing on the information, wherein voice analysis system is configured to exclude a portion of the information corresponding to the communication session, that is not attributable to speech of at least one party of the communication session, from post-recording processing, wherein the portion of the communication session comprises audio from an interactive voice response (IVR) system.

17. The system of claim 16, wherein the voice analysis system is configured to perform at least one of speech recognition and phonetic analysis during the post-recording processing.

18. The system of claim 16, wherein the voice analysis system comprises an identification system operative to identify portions of the communication session containing music, announcements and synthetic human voices.

* * * * *